United States Patent
Haeufgloeckner et al.

(10) Patent No.: US 9,662,734 B2
(45) Date of Patent: May 30, 2017

(54) WELDING DEVICE AND WELDING METHOD FOR A PRODUCTION SYSTEM

(71) Applicant: Robert Bosch GmbH, Stuttgart (DE)

(72) Inventors: Juergen Haeufgloeckner, Schneeberg (DE); Sebastian Zeller, Erbach (DE); Peter Duerrschmied, Michelstadt (DE); Andreas Mader, Michelstadt (DE); Tobias Herkert, Michelstadt (DE); Joachim Rathke, Buchen (DE); Rojo James Chennoth, Erbach (DE)

(73) Assignee: Robert Bosch GmbH, Stuttgart (DE)

(*) Notice: Subject to any disclaimer, the term of this patent is extended or adjusted under 35 U.S.C. 154(b) by 218 days.

(21) Appl. No.: 14/483,384

(22) Filed: Sep. 11, 2014

(65) Prior Publication Data

US 2015/0069030 A1    Mar. 12, 2015

(30) Foreign Application Priority Data

Sep. 11, 2013   (DE) .......................... 10 2013 218 138

(51) Int. Cl.
  *B23K 9/12*      (2006.01)
  *B23K 33/00*    (2006.01)
  *B23K 9/095*    (2006.01)
  *B23K 31/02*    (2006.01)

(52) U.S. Cl.
  CPC ............ *B23K 9/0953* (2013.01); *B23K 9/095* (2013.01); *B23K 31/02* (2013.01)

(58) Field of Classification Search
  CPC .................. B23K 31/02; B23K 9/00; B23K 9/0026–9/0052; B23K 9/02–9/0216; B23K 9/23–9/232; B23K 9/095; B23K 9/0953

USPC ........ 219/101–105, 117.1–118, 125.1–130.1, 219/136–137 WM
  See application file for complete search history.

(56) References Cited

U.S. PATENT DOCUMENTS

| | | | | |
|---|---|---|---|---|
| 4,447,700 A | * | 5/1984 | Cohen | B23K 11/252 219/110 |
| 4,633,059 A | * | 12/1986 | Sarugaku | B23K 9/0216 219/124.22 |
| 4,883,938 A | * | 11/1989 | Sarugaku | B23K 9/12 219/124.34 |
| 8,592,723 B2 | * | 11/2013 | Davidson | B23K 9/095 219/121.14 |
| 8,878,093 B2 | * | 11/2014 | Wang | G01N 27/048 219/117.1 |

* cited by examiner

*Primary Examiner* — Sang Y Paik
(74) *Attorney, Agent, or Firm* — Maginot, Moore & Beck LLP

(57) ABSTRACT

A welding device for a production system having a welding tool and a control device operatively connected to the welding tool. The control device can be configured to control the control the welding tool to connect at least two components with a welded connection with reference to a first parameter. The first parameter defines the welded connection. The control device can be furthered configured to access the first parameter for the welded connection with reference to a hierarchy, wherein the hierarchy identifies a second parameter assigned to the first parameter and the second parameter contains a third parameter, wherein the second parameter defines a welding task and the third parameter defines a first combination of values.

10 Claims, 2 Drawing Sheets

WELDING DEVICE AND WELDING METHOD FOR A PRODUCTION SYSTEM

This application claims priority under 35 U.S.C. §119 to patent application no. DE 10 2013 218138.8 filed on Sep. 11, 2013 in Germany, the disclosure of which is incorporated herein by reference in its entirety.

The present disclosure relates to a welding device and to a welding method for a production system, in which parameters are integrated into a hierarchical, multi-stage parameter structure, which is advantageous, in particular, for easily starting up and maintaining the welding device.

BACKGROUND

In production systems, such as for example production lines for vehicles etc., metallic components are connected by welding using a welding tool of a welding device.

A welding tool is controlled by a welding controller, for which control firmware and an operator interface are required. Hitherto it has been necessary to parameterize each weld spot. There is no linking to the material properties such as combination of sheet metal thicknesses (CSMT) etc. or to special requirements of the welding task, such as pre-treatment or post-treatment etc.

A central change in the parameters for a specific combination of materials means that the corresponding weld spots have to be adapted manually by means of spot lists. This is very complex and susceptible to errors and therefore expensive. In particular, starting up and maintaining the welding device are therefore very complex and difficult and therefore entail high costs. Overall, with previous solutions it has been very difficult to implement global uniform parameters for identical combinations of sheet metal thicknesses.

SUMMARY

The object of the present disclosure is therefore to make available a welding device and welding method for a production system with which the previously mentioned problems can be solved. In particular, a welding device and a welding method for a production system are to be provided, in which the welding device is configured in such a way that the starting up and the maintenance of the welding device is possible in an easy, cost-effective and reliable way.

This object is achieved by means of a welding device for a production system according to the disclosed subject matter. The welding device comprises a control device for controlling at least one welding tool on the basis of a parameter for a welded connection in order to connect at least two components with a welded connection, wherein the parameter for the welded connection in the control device is assigned a parameter of a welding task which is to be carried out by the control device, which parameter contains one or more parameters of a combination of components, and wherein the control device is configured to access the parameter for the welded connection while taking into account this hierarchy.

With the welding device it is possible to manage weld spots with the same material properties, such as combination of sheet metal thicknesses (CSMT) etc., even with identical welding parameters. In addition, these weld spots can also be adapted to specific conditions of the welding task in an easy, reliable and cost-effective way.

Therefore, with the welding device it is possible to change parameters which are based on a combination of components, such as for example the combination of sheet metal thicknesses, in an easy and automatic way for all the weld spots which are assigned to this combination. The same applies to the parameters of welding tasks.

In the case of the welding device, the central parameterization of all the weld spots which are based on the same combination of components, such as for example the combination of sheet metal thicknesses, significantly shortens the starting up. The formation of modules and hierarchies at the welding device permits a systematic and efficient procedure during the starting up. The starting up of the welding device is simplified by the particular hierarchy of the parameters at the welding device and the control device which takes into account this hierarchy. In addition, the maintenance of the welding device is simplified. The susceptibility to errors is minimized.

Advantageous further refinements of the welding device are specified in the disclosed subject matter.

At the welding device, the parameter of a combination of components can be part of the parameter of the welding task which is to be carried out by the control device.

Furthermore, it is possible that the parameter for a welded connection comprises a global description of a welding task which is unambiguous for all the control means, which description can be assigned unambiguously to a position on a product which is to be produced with the production system.

It is also conceivable that the parameter of a combination of components describes a combination of sheet metal thicknesses and/or a combination of materials and/or a quality of the components at the surface thereof.

In addition, the parameter of the welding task which is to be carried out by the control device comprises information on connections with the same combination of sheet metal thicknesses/materials, irrespective of the position on the product which is to be produced with the production system, but while taking into account the peripheral conditions at the position of the welding task which is to be carried out. In this way, the peripheral conditions at the position of the welding task which is to be carried out can be a shunt and/or adhesive.

Furthermore, there is a possibility that the parameter of the welding task which is to be carried out by the control device is assigned a parameter of a current profile and force profile for a specific combination of sheet metal thicknesses or for at least one special task, wherein the at least one special task comprises a pre-treatment and/or post-treatment with respect to the position of the welding task which is to be carried out.

The welding device described above can be part of a production system which is configured to manufacture a product composed of at least two components which are connected to a welded connection which is carried out by the welding device.

The object is also achieved by means of a welding method for a production system according to the disclosed subject matter. In the welding method a control device of a welding device controls at least one welding tool on the basis of a parameter for a welded connection in order to connect at least two components with a welded connection, wherein the parameter for the welded connection in the control device is assigned a parameter of the welding task which is to be carried out by the control device, which parameter contains one or more parameters of a combination of components, and wherein the control device accesses the parameter for the welded connection while taking into account this hierarchy.

The welding method achieves the same advantages as are mentioned above with respect to the welding device.

Further advantageous refinements of the welding method are specified in the disclosed subject matter.

In the welding method, the parameter of a combination of components is part of the parameter of the welding task which is to be carried out by the control device.

Further possible implementations of the disclosure also comprise non-explicitly mentioned combinations of features or embodiments which are described above or below with respect to the exemplary embodiments. In this context, a person skilled in the art will also add individual aspects as improvements or additions to the respective basic form of the disclosure.

BRIEF DESCRIPTION OF THE DRAWINGS

The disclosure is described in more detail below with reference to the appended drawing and by means of exemplary embodiments. In the drawing.

DETAILED DESCRIPTION

In the figures, identical or functionally identical elements are, unless stated otherwise, provided with the same reference symbols.

Figure 1:
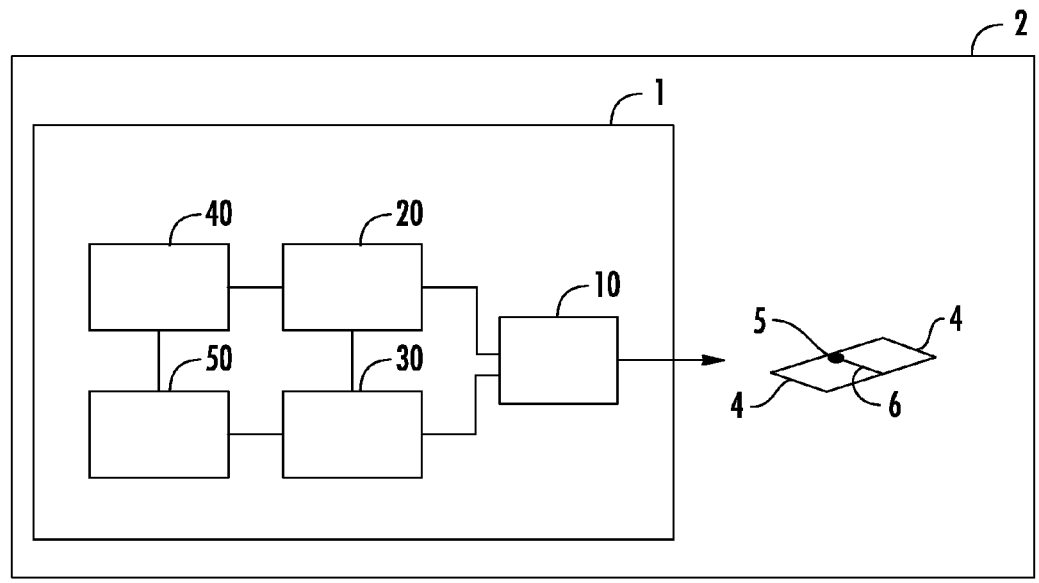
FIG. 1 shows a schematic block circuit diagram of a welding device according to a first exemplary embodiment.

FIG. 1 shows in very schematic form a welding device 1 which can be used in a production system 2, such as for example a production line, for vehicles, furniture, buildings etc. in which metallic components 4 are connected by welding by means of a welded connection, in order to manufacture a product from the components 4. The welded connection can be, in particular, a weld spot 5, a weld seam 6 etc. which is to be applied to a position provided for that purpose on components 4, such as for example bodywork parts of a vehicle etc.

The welding device 1 comprises a welding tool 10 which is controlled by a control device 20 for executing weld spots 5 and/or weld seams 6 on the components 4. The weld device 1 also comprises a memory device 30, an operator control device 40 and an assignment device 50. The operator control device 40 can be, for example, a touch-sensitive or touch-insensitive screen. The operator control device 40 serves to operate the welding device 1 in order to execute a welding process with the welding tool 10.

Parameters which can be used by the welding device 1 during the control of the welding tool 10 are stored in the memory device 30. The assignment device 50 serves to assign the parameters and the data thereof into the structure provided for them, as will be described in more detail later.

Figure 2:
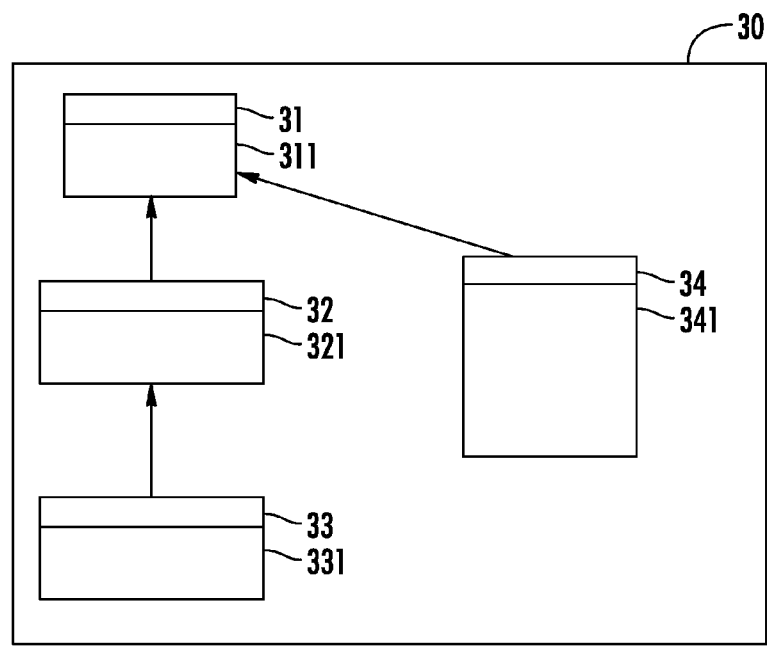
FIG. 2 shows a schematic illustration of the hierarchy of the parameters for the welding device according to the first exemplary embodiment and FIG. 3 shows a schematic illustration of the hierarchy of the parameters for the welding device according to the first exemplary embodiment for a specific example.

FIG. 2 illustrates the structure of the parameters 31 to 34 with the respective data 311, 321, 331, 341 thereof in the memory device 30 in a very schematic manner. Here, the parameters 32 and 34 are subordinate to the parameter 31. In addition, the parameter 33 is part of the parameter 32. The parameter 31 is therefore at the top position in the hierarchy of the parameters. The parameter 33 is in the bottom position in the hierarchy of the parameters.

The parameter 31 stands for a welded connection such as a weld spot 5 etc. for which the data 311, such as the welded connection identification number, welded connection description, welding task name, welding tool name etc., are stored. The parameter 31 for a welded connection comprises a global description of a welding task which is unambiguous for all the control means, which description can be assigned unambiguously to a position on a product which is to be produced with the production system 2.

The parameter 32 stands for a welding task and it comprises data, in particular, for special requirements of the welding task which is to be carried out by the welding device 20. The parameter 32 is assigned specific requirements of the welding task which is to be carried out by the control device 20. The data 321 such as the welding task name, name of the original welding task, the lead time, post-weld holding time, number of sequenced blocks, welding task identification number etc. are stored by the parameter 32. The parameter 32 of a welding task represents parameterization of similar welding tasks, such as for example combinations of sheet metal thicknesses with the same peripheral conditions such as, for example, shunts, adhesive at the position of the welded connection to be made etc. The parameter 32 of the welding task which is to be carried out by the control device 20 therefore comprises information on connections with the same combination of sheet metal thicknesses/materials independently of the position on the product which is to be produced for the production system, while taking into account peripheral conditions at the position of the welding task which is to be carried out.

The parameter 33 stands for a sequence block for which the data 331, such as the block number, sheet metal thickness combination identification number, sheet metal thickness combination description, name of the original sheet metal thickness combination, block type, number of welding blocks, number of monitoring blocks, type of operating control, controls for the transition in the next block etc., are stored. The parameter 33 of a sequence block represents parameterization of a current profile and force profile for a specific combination of sheet metal thicknesses and/or for special tasks such as pre-treatment or pre conditioning, post-treatment etc. The parameter 33 is referred to below also as a parameter of a combination of components. The parameter 33 can describe, in addition to or as an alternative to a description of a combination of sheet metal thicknesses of the components 4, also a combination of materials of the components 4 and/or quality of the components 4 on the surface thereof. The parameters 33 of the individual sequence blocks can also comprise monitoring variables such as temperature, current, force etc., and reference curves such as current, force etc.

The parameters 34 stands for a welding tool, such as the welding tool 10 etc. for which the data 341, such as the welding tool name, welding tool type, maximum electrode wear, maximum number of milling steps, maximum welding tool wear, number of the adjustment curve, welding tool drive parameters, welding transformer type, actual electrode wear, number of milling steps, actual welding tool wear, actual welding tool resistance, drive actual values etc., are stored.

Furthermore, various types of sequence blocks which are described by a parameter 33 constitute in combination a welding task. In this context, parameters 32 of a welding task are no longer considered only as a monolithic data record but instead they are structured into sequencing blocks of various types, such as pre treatment or pre-conditioning (pre-weld), generate welded connection (main weld) and post-treatment (post weld).

The pre-treatment or pre-conditioning in the case of a welding task serves to manufacture identical starting conditions for the welded connection.

The "generate welded connection" is the actual generation of the welded connection. Parameters for this purpose can be determined and evaluated, for example, in the laboratory on sheet metal strips of components 4 which are to be welded.

The post-treatment serves, for example, for regulated slow cooling, for carrying out additional tong movements, for carrying out an additional subsequent monitoring operation/monitoring operations etc.

A sequence block with special tasks, such as for example adhesive pre-conditioning as a pre-treatment or pre-conditioning and heat post-treatment as post-treatment, is therefore possible. The special sequences are therefore configured as pre-treatment or pre conditioning and post-treatment and produce, with the "generate welded connection" sequence, the actual welding sequence, a complete welding task. The welding task can be assigned to any desired number of welded connections by the assignment device 50, if appropriate accompanied by interrogation of an input by an operator.

It is possible that an individual copy of the sequence block is created for each welding task. The source for this can be, if appropriate, a starting up database. However, another memory device is also conceivable as a source. In the case of changes to the basic parameterization, that is to say possibly also the copying of the sequence block, reconciliation can take place, optionally using a tool which is suitable for that purpose.

Figure 3:
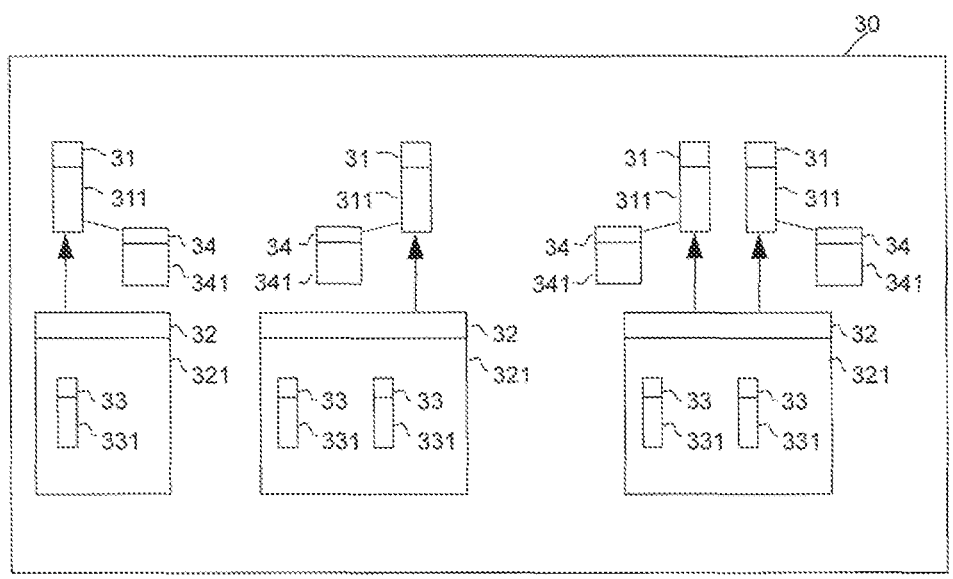

FIG. 3 shows the structure of the data in the case of the welding device 1 for the case in which three different welding tasks are to be carried out, wherein in each case two of the welding tasks can be performed only with a welding tool 10, as is shown on the left-hand side and in the center of FIG. 3, and one of the welding tasks is to be carried out by two different welding tools 10, as is shown on the right-hand side of FIG. 3. Other numbers of welding tasks and welding tools 10 are also possible.

The individual data which occur, for example, during ongoing operation of the welding device 1 are assigned by the assignment device 50 to the individual data placeholders in the case of the parameters 31 to 34. In addition, the assignment device 50 can assign the individual data items to the individual data placeholders in the case of the parameters 31 to 34 before or during starting up of the welding device 1. This can take place automatically, for example using a computer program. If necessary, the data can also be interrogated by interrogation in the case of an operator of the welding device 1. A computer program can also be used here, for example. In addition, the operator control device 40 can be used for this purpose.

When a welding method is carried out by the welding device 1, the control device 20 can access the parameter 31 for the welded connection while taking into account the hierarchy described above.

According to a second exemplary embodiment, the assignment device 50 is also configured for assigning the data to the individual data placeholders in the case of the parameters 31 to 34, if a global change in parameter occurs. In this context, the assignment device 50 can also assign the data 331 of a changed parameter 33 of a sequence block, which are part of a specific welding task according to the parameter 32, to another welding task according to the parameter 32, which welding task also comprises the changed parameter 33 of a sequence block. For example, the assignment device 50 can assign the data 331 of a changed parameter 33 of a sequence block which is part of the welding task, illustrated on the right-hand side in FIG. 3, according to the parameter 32, to the welding task, illustrated on the left-hand side in FIG. 3, according to the parameter 32, which also comprises the changed parameter 33 of a sequence block. Alternatively, the assignment device 50 can also assign the data 331 of a changed parameter 33 of a sequence block to all the welding tasks. As a result, for example, changed combinations of sheet metal thicknesses with the same peripheral conditions can be changed for the respective welding tasks in question.

Additionally or alternatively, the assignment device 50 can also assign the data of a changed parameter 34 of a welding tool to some or to all of the welded connections.

Otherwise, the welding device 1 and the welding method which can be carried out by it is the same as the welding device 1 and the welding method according to the first exemplary embodiment.

All the refinements of the welding device 1 and of the welding method which are described above can be used individually or in all possible combinations. In particular, all the features and/or functions of the exemplary embodiments described above can be combined as desired. In addition, in particular the following modifications are conceivable.

The parts which are illustrated in the figures are illustrated schematically and can differ, in the precise embodiment, from the forms shown in the figures as long as the functions described above for said parts are ensured.

The memory device 30 can be part of the control device 20. Furthermore, the assignment device 50 can be part of the control device 20. Furthermore, the assignment device 50 can be part of the operator control device 20.

The assignment device 50 can have a plurality of subunits, which each carry out one or more of the functions of the assignment device 50 which are described above.

The welding device 1 can also have more than one control device 20.

What is claimed is:

1. A welding device for a production system, comprising:
   at least one welding tool; and
   a control device operatively connected to the welding tool, wherein the control device is configured to:
   control the welding tool to connect at least two components with a welded connection with reference to a first parameter, wherein the first parameter defines the welded connection; and
   access the first parameter with reference to a hierarchy in which a second parameter is subordinate to the first parameter and a third parameter is subordinate to the second parameter,
   wherein the second parameter defines a welding task which is assigned unambiguously to a position on a product to be produced with the production system and the third parameter defines a combination of the at least two components,
   wherein the second parameter includes information describing welded connections with a same combination of at least one of sheet metal thicknesses and materials, and
   wherein the information is based at least in part on conditions at a position of the welding task.

2. The welding device according to claim 1, wherein the second parameter includes the third parameter.

3. The welding device according to claim 1, further comprising:
at least two welding tools,
wherein the control device is further configured to access the first parameter with reference to a hierarchy, in which a fourth parameter is subordinate to the first parameter, and
wherein the fourth parameter defines a welding tool of the at least two welding tools with which the welded connection of a product produced with the production system is to be welded.

4. The welding device according to claim 1, wherein the third parameter includes information describing at least one of sheet metal thicknesses, materials, and quality of the at least two components.

5. The welding device according to claim 1, further comprising an assignment device configured to assigned individual data items to individual data placeholders in a case of the first parameter, second parameter, and third parameter during ongoing operation of the welding device.

6. The welding device according to claim 1, wherein the conditions at the position of the welding task are at least one of a shunt and an adhesive.

7. The welding device according to claim 1, wherein the second parameter includes one or more parameters of a current profile and a force profile for a second combination of sheet metal thicknesses or for at least one additional task, wherein the at least one additional task comprises at least one of a pre-treatment and a post-treatment with respect to the position of the welding task.

8. A production system, comprising:
a welding device having:
a welding tool; and
a control device operatively connected to the welding tool, wherein the control device is configured to:
control the welding tool to connect at least two components with a welded connection with reference to a first parameter, wherein the first parameter defines the welded connection; and
access the first parameter with reference to a hierarchy in which a second parameter is subordinate to the first parameter and a third parameter is subordinate to the second parameter,
wherein the second parameter defines a welding task which is assigned unambiguously to a position on a product to be produced with the production system and the third parameter defines a combination of the at least two components,
wherein the second parameter includes information describing welded connections with a same combination of at least one of sheet metal thicknesses and materials, and
wherein the information is based at least in part on conditions at a position of the welding task,
wherein the production system is configured to manufacture a product, wherein the product includes the at least two components connected to a welded connection by the welding device.

9. A welding method for a production system, comprising:
controlling, using a control device, at least one welding tool to connect at least two components with a welded connection with reference to a first parameter, wherein the first parameter defines the welded connection; and
accessing the first parameter for the welded connection with reference to a hierarchy in which a second parameter is subordinate to the first parameter and a third parameter is subordinate to the second parameter,
wherein the second parameter defines a welding task which is assigned unambiguously to a position on a product to be produced with the production system and the third parameter defines a combination of the at least two components,
wherein the second parameter includes information describing welded connections with a same combination of at least one of sheet metal thicknesses and materials, and
wherein the information is based at least in part on conditions at a position of the welding task.

10. The welding method according to claim 9, wherein the second parameter includes the third parameter.

* * * * *